S. F. EMERSON.
Gate.
No. 56,392.
Patented July 17, 1866.
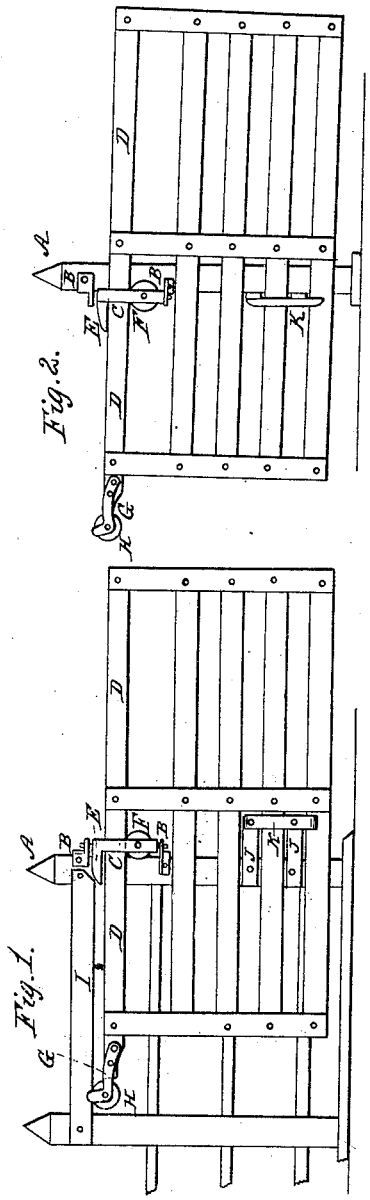
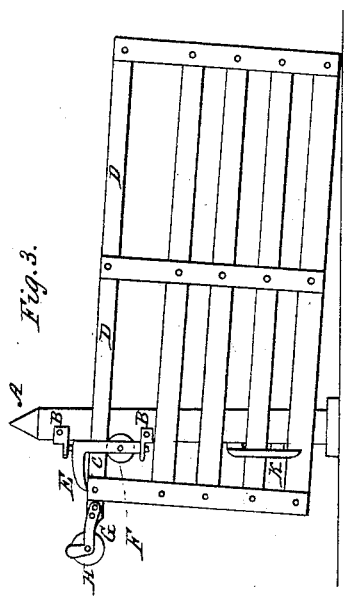
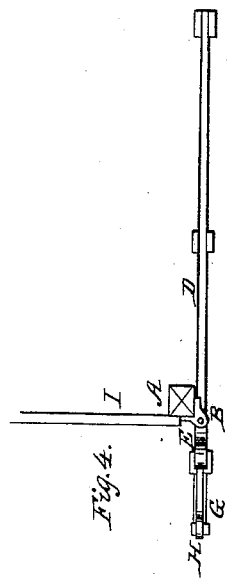
Witnesses:
Inventor:

UNITED STATES PATENT OFFICE.

SIMEON F. EMERSON, OF SEVILLE, OHIO.

IMPROVEMENT IN GATES.

Specification forming part of Letters Patent No. 56,392, dated July 17, 1866.

*To all whom it may concern:*

Be it known that I, SIMEON F. EMERSON, of Seville, Medina county, State of Ohio, have invented a new and useful Improvement in Gates; and I do hereby declare that the following is a full, clear, and exact description thereof, which will enable others skilled in the art to make and use the same, reference being had to the accompanying drawings, forming part of this specification, in which—

Figure 1 is a side view of my improved gate slid back or partly open. Fig. 2 is a side view of the same slid back and swung round or fully open. Fig. 3 is a side view of the same slid back, swung round, and again drawn out. Fig. 4 is a top view of Fig. 3.

Similar letters of reference indicate like parts.

My invention has for its object to furnish an improved gate which may be slid back to admit foot-passers and swung back to admit vehicles, the gate being pivoted to the revolving hinge in such a way that it may be balanced or its forward end allowed to drop to to the ground to detain the gate in position; and it consists, first, of a pivoted hinge formed with a horizontal arm, in combination with the gate and with the post; second, in the combination, with the top rail of the fence and with the top board of the gate, of a roller pivoted to two arms having projecting ends or lugs; and, third, in the combination of a bar and arms with the gate and with the post, as hereinafter more fully described.

A is the post to which the gate is pivoted. To this post, near its top, are attached two angle-ears, B, as shown in the drawings. Between these ears B is pivoted a slotted bar, C, through which slot is passed the upper or top board, D, of the gate. In the lower part of this slot is pivoted a roller, F, upon which the lower edge of the top board, D, rests. Upon the upper end of the slotted bar C is formed an arm, E, extending toward the rear end of the gate, as shown in the drawings.

To the rear end of the top board, D, are attached two arms, G, with upwardly-projecting ends or lugs. Between these arms is pivoted a roller, H, which rolls along the under edge of the top board, I, the projecting lugs or ends of the arms G keeping the gate in its proper position while being slid back.

To the post A, near its foot, are attached two arms, J, to the ends of which is attached a cross-bar, K. This bar acts as a guide to keep the gate in its proper relative position both while sliding back and while swinging round.

The top board, D, of the gate slightly tapers from its central part toward its rear end, as shown in the drawings, so that when the gate is in the position shown in Fig. 2 the arm E will rest upon the upper edge of the board D and sustain the forward end of the gate free from the ground; but when the gate is in the position shown in Fig. 3 the forward end of the gate will rest upon the ground and retain the gate in any position in which it may be placed.

By this arrangement, also, the forward end of the gate may be raised far enough from the ground while being swung to enable said forward end to pass over snow or any other obstruction that may be in its way.

I claim as new and desire to secure by Letters Patent—

1. The horizontal arm E of the pivoted hinge C, operating with the top board, D, of the gate, substantially as described, and for the purposes set forth.

2. The combination of the roller H and the arms G, having projecting ends or lugs, with the top rail, I, of the fence and with the top board, D, of the gate, substantially as described, and for the purpose set forth.

3. The combination of the guide-bar K and arms J with the post A and with the gate, substantially as described, and for the purpose set forth.

SIMEON F. EMERSON.

Witnesses:
JOSEPH ROSS,
J. M. POWERS.